(12) United States Patent
Hayashi et al.

(10) Patent No.: US 9,506,399 B2
(45) Date of Patent: Nov. 29, 2016

(54) ELECTRIC SUPERCHARGING DEVICE

(71) Applicant: MITSUBISHI HEAVY INDUSTRIES, LTD., Tokyo (JP)

(72) Inventors: Noriyuki Hayashi, Tokyo (JP); Motoki Ebisu, Tokyo (JP)

(73) Assignee: Mitsubishi Heavy Industries, Ltd., Tokyo (JP)

( * ) Notice: Subject to any disclaimer, the term of this patent is extended or adjusted under 35 U.S.C. 154(b) by 227 days.

(21) Appl. No.: 14/347,765

(22) PCT Filed: Oct. 29, 2012

(86) PCT No.: PCT/JP2012/077877
§ 371 (c)(1),
(2) Date: Mar. 27, 2014

(87) PCT Pub. No.: WO2013/099418
PCT Pub. Date: Jul. 4, 2013

(65) Prior Publication Data
US 2014/0311463 A1    Oct. 23, 2014

(30) Foreign Application Priority Data

Dec. 28, 2011   (JP) .................................. 2011-289250

(51) Int. Cl.
*F02B 33/44*    (2006.01)
*F02B 39/04*    (2006.01)
(Continued)

(52) U.S. Cl.
CPC ............... *F02B 39/12* (2013.01); *F02B 33/40* (2013.01); *F02B 39/04* (2013.01); *F02B 39/08* (2013.01);
(Continued)

(58) Field of Classification Search
CPC ........ F02B 39/12; F02B 33/44; F02B 39/04; F02B 39/08; F02B 39/10; F02B 39/16; F02B 39/005; F04B 1/0413; F04B 17/03; F04B 23/103; F04B 23/14; F04D 25/04; F04D 25/0606; F16H 61/423; F16H 61/425; F16H 61/435; F16H 39/02

USPC ....... 60/608; 123/559.1, 559.3; 91/476, 491; 475/159
See application file for complete search history.

(56) References Cited

U.S. PATENT DOCUMENTS 2,949,902 A * 8/1960 Calovolo ................ F02B 33/00
123/561
4,729,225 A    3/1988 Bucher
(Continued)

FOREIGN PATENT DOCUMENTS

CN    201771711 U    3/2011
FR    2708236 A1 *  2/1995 .............. F02B 37/10
(Continued)

OTHER PUBLICATIONS

A Machine Translation to Shuichi Sano et al. (Pub. No. JP 2001-324015 A), published on Nov. 22, 2001.*
(Continued)

*Primary Examiner* — Thai Ba Trieu
(74) *Attorney, Agent, or Firm* — Birch, Stewart, Kolasch & Birch, LLP

(57) ABSTRACT

An object is to provide an electric supercharging device that has a high degree of freedom in layout and can suppress the generation of heat from an electric motor. The electric supercharging device 1 includes an electric motor 2, a compressor 3 that supercharges intake air for a vehicle engine, a hydraulic accelerator 10 that accelerates the rotation of the electric motor 2 and transmits the rotation to the compressor 3, and rotation speed adjustment controller 4 that controls the rotation speed of the electric motor 2 and an acceleration ratio of the hydraulic accelerator 10 and adjusts the rotation speed of the compressor 3. The hydraulic accelerator 10 includes a variable displacement hydraulic pump 12 that is connected to the electric motor 2 and is driven by the electric motor 2, a variable displacement hydraulic motor 14 that is connected to the compressor 3 and is driven by hydraulic oil supplied from the hydraulic pump 12, and a hydraulic circuit 13 that is formed by the connection between the hydraulic pump 12 and the hydraulic motor 14.

7 Claims, 5 Drawing Sheets

(51) Int. Cl.

| | |
|---|---|
| *F16H 57/04* | (2010.01) |
| *F16H 39/02* | (2006.01) |
| *F02B 39/12* | (2006.01) |
| *F02B 39/08* | (2006.01) |
| *F02B 39/10* | (2006.01) |
| *F16H 61/425* | (2010.01) |
| *F16H 61/435* | (2010.01) |
| *F02B 33/40* | (2006.01) |
| *F02B 39/16* | (2006.01) |
| *F16H 61/423* | (2010.01) |
| *F04B 17/03* | (2006.01) |
| *F04B 1/04* | (2006.01) |
| *F04B 23/10* | (2006.01) |
| *F04B 23/14* | (2006.01) |
| *F04D 25/04* | (2006.01) |
| *F04D 25/06* | (2006.01) |
| *F02B 39/00* | (2006.01) |

(52) U.S. Cl.
CPC ............. *F02B 39/10* (2013.01); *F02B 39/16* (2013.01); *F04B 1/0413* (2013.01); *F04B 17/03* (2013.01); *F04B 23/103* (2013.01); *F04B 23/14* (2013.01); *F04D 25/04* (2013.01); *F04D 25/0606* (2013.01); *F16H 61/423* (2013.01); *F16H 61/425* (2013.01); *F16H 61/435* (2013.01); *F02B 39/005* (2013.01); *F16H 39/02* (2013.01)

(56) References Cited

U.S. PATENT DOCUMENTS

| | | | | |
|---|---|---|---|---|
| 4,945,816 A * | 8/1990 | Mestieri | ................ | F01B 1/062 91/476 |
| 5,125,806 A | 6/1992 | Quick et al. | | |
| 5,890,468 A * | 4/1999 | Ozawa | ................... | F02B 39/04 123/561 |
| 6,470,786 B2 * | 10/2002 | Uski | ..................... | F03C 1/0425 91/476 |
| 6,837,141 B1 * | 1/2005 | Edelson | ................. | F16H 39/20 91/491 |
| 7,000,601 B2 * | 2/2006 | Yasui | ...................... | F02B 39/04 123/561 |
| 7,464,549 B1 | 12/2008 | Edelson et al. | | |
| 8,397,506 B1 * | 3/2013 | Wright | ..................... | F01K 7/32 415/110 |
| 8,608,609 B2 * | 12/2013 | Sherrill | ................ | F02D 41/0007 475/159 |
| 8,701,636 B2 * | 4/2014 | Jensen | ..................... | F02B 39/04 60/607 |
| 8,935,077 B2 * | 1/2015 | Garrard | ..................... | F02B 39/10 60/607 |
| 9,074,578 B2 * | 7/2015 | Souply | .................. | F03C 1/0409 91/476 |
| 9,212,601 B2 * | 12/2015 | Meinheit | ................. | B60K 25/02 60/607 |
| 2012/0266595 A1 * | 10/2012 | Buschur | .................. | F02B 39/08 60/607 |
| 2013/0149171 A1 * | 6/2013 | Caldwell | ................ | F04B 17/02 417/53 |
| 2016/0032817 A1 * | 2/2016 | Buschur | .................. | F02B 33/40 60/605.1 |

FOREIGN PATENT DOCUMENTS

| | | |
|---|---|---|
| JP | 62-111124 A | 5/1987 |
| JP | 2-64224 A | 3/1990 |
| JP | 7-119478 A | 5/1995 |
| JP | 10-141206 A | 5/1998 |
| JP | 2001-304409 A | 10/2001 |
| JP | 2001-324015 A | 11/2001 |
| JP | 2004-190522 A | 7/2004 |
| JP | 2006-90174 A | 4/2006 |
| JP | 2006-242051 A | 9/2006 |
| JP | 2006-258094 A | 9/2006 |
| JP | 2008-111384 A | 5/2008 |
| JP | 2009-138671 A | 6/2009 |
| JP | 2010-1896 A | 1/2010 |
| WO | WO 2011/071529 A1 | 6/2011 |
| WO | WO 2011/148653 A2 | 12/2011 |

OTHER PUBLICATIONS

Chinese Office Action and Search Report, dated Aug. 28, 2015, for Chinese Application No. 201280047621.4, together with an English translation thereof.
Extended European Search Report dated Jun. 17, 2015 issued in corresponding EP Application No. 12863622.2.
International Preliminary Report on Patentability for PCT/JP2012/077877 mailed Jul. 10, 2014 with an English translation.
International Search Report of PCT/JP2012/077877 dated Jan. 29, 2013.
Notice of Allowance for corresponding Japanese Application No. 2011-289250 dated Jun. 20, 2014 with an English Translation.

* cited by examiner

CROSS-SECTIONAL VIEW TAKEN ALONG D-D

ELECTRIC SUPERCHARGING DEVICE

TECHNICAL FIELD

The present invention relates to an electric supercharging device that supercharges intake air for an internal combustion engine of a vehicle by rotating a compressor through the drive of an electric motor.

BACKGROUND ART

In the past, there has been a supercharger that rotates a turbine at a high speed by exhaust gas of an internal combustion engine of a vehicle or the like and supercharges an internal combustion engine by driving a compressor sharing a rotating shaft with the turbine. Since the drive of such a supercharger requires the exhaust gas of the internal combustion engine, such a supercharger cannot cope with the supercharging of an internal combustion engine at the time of start, rapid acceleration, or the like. Accordingly, an electric supercharging device, which drives a rotating shaft of the compressor by an electric motor, is used. An example of this electric supercharging device is disclosed in PTL 1. The electric supercharging device disclosed in PTL 1 will be described below with reference to FIG. 6.

As shown in FIG. 6, an electric supercharging device 102, which is assembled with an air supply flow passage 101 of an engine 100 that is an internal combustion engine, includes a compressor 104 that is provided so as to face the air supply flow passage 101, an electric motor 106 that drives the compressor 104, a controller 108 that controls the electric motor 106, a steering lever that is manually operated by a driver, supercharging amount adjusting means 110 for commanding the controller 108 to control the amount of supercharging of the electric supercharging device 102, display means 112 that is formed of a display provided on an instrument panel (not shown) disposed in front of a driver's seat and displays the amount of supercharging, and a power source 114 such as an in-vehicle battery or an alternator.

The controller 108 includes a drive unit 116 that drives the electric motor 106 and a control command unit 118 that controls the drive unit 116 according to the amount of supercharging set by a driver. For example, an inverter is built in the controller 108, and the controller 108 converts electric power, which is supplied from the power source 114, into alternating current by the inverter and controls the rotation speed of the electric motor 106 by arbitrarily changing a voltage and a frequency.

Since the voltage of an electrical storage device such as a battery, which forms the power source 114, is low (for example, 12 V), it is necessary to allow large current flow in the electric motor 106 to rotate the electric motor 106 at a high speed. When a large amount of current is allowed to flow in the electric motor 106, the amount of heat generated from the electric motor 106 is increased. For this reason, a cooler for cooling the electric motor 106 needs to be added.

CITATION LIST

Patent Literature

[PTL 1] Japanese Unexamined Patent Application Publication No. 2006-258094

SUMMARY OF INVENTION

Technical Problem

Since the electric motor is directly connected to the compressor in the electric supercharging device disclosed in PTL 1, the electric motor is installed near the internal combustion engine of a vehicle. Since a plurality of other devices are installed near the internal combustion engine, there is a limit on the layout. For this reason, there is a problem in that it is difficult to install a cooler and the like.

The invention has been made under the above-mentioned circumstances in the related art, and an object of the invention is to provide an electric supercharging device that has a high degree of freedom in layout and can suppress the generation of heat from an electric motor.

Solution to Problem

The invention has been made to achieve the above-mentioned task and object in the related art. An electric supercharging device of the invention supercharges intake air for an internal combustion engine of a vehicle by rotating a compressor through the drive of an electric motor. The electric supercharging device includes acceleration means for accelerating a rotation of the electric motor and transmitting the rotation to the compressor. The acceleration means includes: a variable displacement hydraulic pump that is connected to the electric motor, is driven by the electric motor, and is capable of adjusting a displacement volume; a variable displacement hydraulic motor that is connected to the compressor, is driven by hydraulic oil supplied from the hydraulic pump, and is capable of adjusting a displacement volume; and a rotation speed adjusting unit that makes a ratio of the displacement volume of the hydraulic pump to the displacement volume of the hydraulic motor higher than by controlling the hydraulic pump and the hydraulic motor and makes a rotation speed of the hydraulic motor higher than a rotation speed of the electric motor.

Since the electric supercharging device includes the acceleration means for accelerating a rotation of the electric motor and transmitting the rotation to the compressor, it is possible to rotate the compressor at speed higher than the rotation speed of the electric motor. Accordingly, it is possible to rotate the compressor at a prescribed rotation speed without rotating the electric motor at a high speed. Therefore, it is possible to prevent the electric motor from reaching a high temperature.

Further, since the acceleration means includes the hydraulic motor, the hydraulic pump, and the like, the hydraulic pump can be disposed at a position away from the hydraulic motor. That is, since the electric motor connected to the hydraulic pump can be disposed at a position away from the compressor, the degree of freedom in layout is improved. Therefore, it is possible to obtain a layout in which a cooler for cooling the electric motor can be installed.

Furthermore, since the acceleration means drives the hydraulic motor by hydraulic oil that circulates, heat is not confined in the acceleration means. Accordingly, a cooler does not need to be provided, unlike in the electric motor. Moreover, the variable displacement hydraulic pump and the variable displacement hydraulic motor are used, and the rotation speed adjusting unit makes a ratio of the displacement volume of the hydraulic pump to the displacement volume of the hydraulic motor higher than 1 by controlling the hydraulic pump and the hydraulic motor, so that the rotation speed of the hydraulic motor can be increased. Accordingly, a mechanical accelerator does not need to be separately provided.

If the rotation speed of the electric motor is rapidly increased to rapidly increase the rotation speed of the compressor, there is a concern that the electric motor may step out (a state in which a synchronous speed and an actual rotation speed are different from each other). However, according to the invention, it is possible to cope with the rapid increase of the rotation speed of the compressor 3 by increasing the acceleration ratio of the acceleration means without changing the rotation speed of the electric motor. Accordingly, it is possible to prevent the electric motor from stepping out.

In addition, since the electric supercharging device includes the acceleration means, it is possible to operate the electric motor at a rotation speed where the torque output of the electric motor is highest by adjusting the acceleration ratio of the acceleration means. Accordingly, an expensive electric motor that can be rotated at a high speed and can output high torque does not need to be used, and an inexpensive electric motor may be used.

In the invention, the acceleration means may further include a planetary roller type traction drive or a planetary type gear. The planetary roller type traction drive or the planetary type gear includes a sun roller or a sun gear (hereinafter, referred to as a sun member) that is connected to a rotating shaft of the compressor, a plurality of planetary rollers or planetary gears (hereinafter, referred to as planetary members) that are disposed along the outer periphery of the sun member and come into contact with the sun member, a carrier that supports the plurality of planetary members so as to allow the planetary members to freely rotate and revolve, and an annular ring roller that is disposed outside the plurality of planetary members and comes into contact with the plurality of planetary members. An output shaft of the hydraulic motor may be connected to any one of the carrier and the ring roller.

Since the acceleration means further includes the planetary roller type traction drive or the planetary type gear as described above, it is possible to further increase the rotation speed that has been increased by the hydraulic pump and the hydraulic motor.

Further, when the rotation speed of the compressor has been set in advance, it is possible to reduce the rotation speed of the hydraulic motor by further using the planetary roller type traction drive or the planetary type gear as the acceleration means. Accordingly, it is possible to prevent the generation of an excessive centrifugal force that is generated in the hydraulic motor at the time of the high-speed rotation of the hydraulic motor.

Furthermore, when the planetary roller type traction drive is used, it is possible to reduce the vibration and noise of the electric supercharging device. In addition, since bearings for supporting the shaft of the compressor do not need to be used, the structure of the electric supercharging device can be simplified.

Moreover, in the invention, the variable displacement hydraulic pump may include a plurality of hydraulic chambers that are surrounded by cylinders and pistons sliding in the cylinders, a cam that has a cam curved surface engaged with the pistons, high-pressure valves that open and close high-pressure oil flow passages of the respective hydraulic circuits connected to the respective hydraulic chambers, and low-pressure valves that open and close low-pressure oil flow passages of the respective hydraulic circuits connected to the respective hydraulic chambers. The plurality of cylinders may be continuously disposed in an annular shape around a rotating shaft of the hydraulic pump, and the cam may be formed of an annular ring cam having a wavy cam curved surface on which a plurality of concave portions and convex portions are alternately formed side by side.

Further, in the invention, the variable displacement hydraulic motor may include a plurality of hydraulic chambers that are surrounded by cylinders and pistons sliding in the cylinders, a cam that has a cam curved surface engaged with the pistons, high-pressure valves that open and close high-pressure oil flow passages of the respective hydraulic circuits connected to the respective hydraulic chambers, and low-pressure valves that open and close low-pressure oil flow passages of the respective hydraulic circuits connected to the respective hydraulic chambers. The plurality of cylinders may be continuously disposed in an annular shape around a rotating shaft of the hydraulic motor, and the cam may be formed of an eccentric cam that is provided to be eccentric from an axis of a rotating shaft of the motor.

Since it is possible to adjust a flow rate without throttling by controlling the operating states of the plurality of hydraulic chambers (the number of the hydraulic chambers or the ranges of the operating strokes of the pistons provided in the hydraulic chambers) of the hydraulic pump and the hydraulic motor with a small amount of hydraulic oil by the high-pressure valves and the low-pressure valves as described above, it is possible to adjust an acceleration ratio and a deceleration ratio over a wide range with low loss and high responsiveness. Accordingly, it is possible to efficiently transmit power from the electric motor to the compressor. If the hydraulic pump and the hydraulic motor according to the invention are formed of the above-mentioned variable displacement hydraulic pump and the above-mentioned variable displacement hydraulic motor, it is possible to obtain an electric supercharging device that has high responsiveness, high efficiency, and excellent controllability.

Advantageous Effects of Invention

According to the invention, it is possible to provide an electric supercharging device that has a high degree of freedom in layout and can suppress the generation of heat from an electric motor.

DESCRIPTION OF EMBODIMENTS

Embodiments of the invention will be described in more detail below with reference to the drawings.

However, the scope of the invention is not limited to the following embodiments. As long as it is not particularly described, the dimensions, materials, shapes, relative arrangement, and the like of components described in the following embodiment are not to limit the scope of the invention to the following embodiment and are merely exemplary.

First Embodiment

Figure 1:
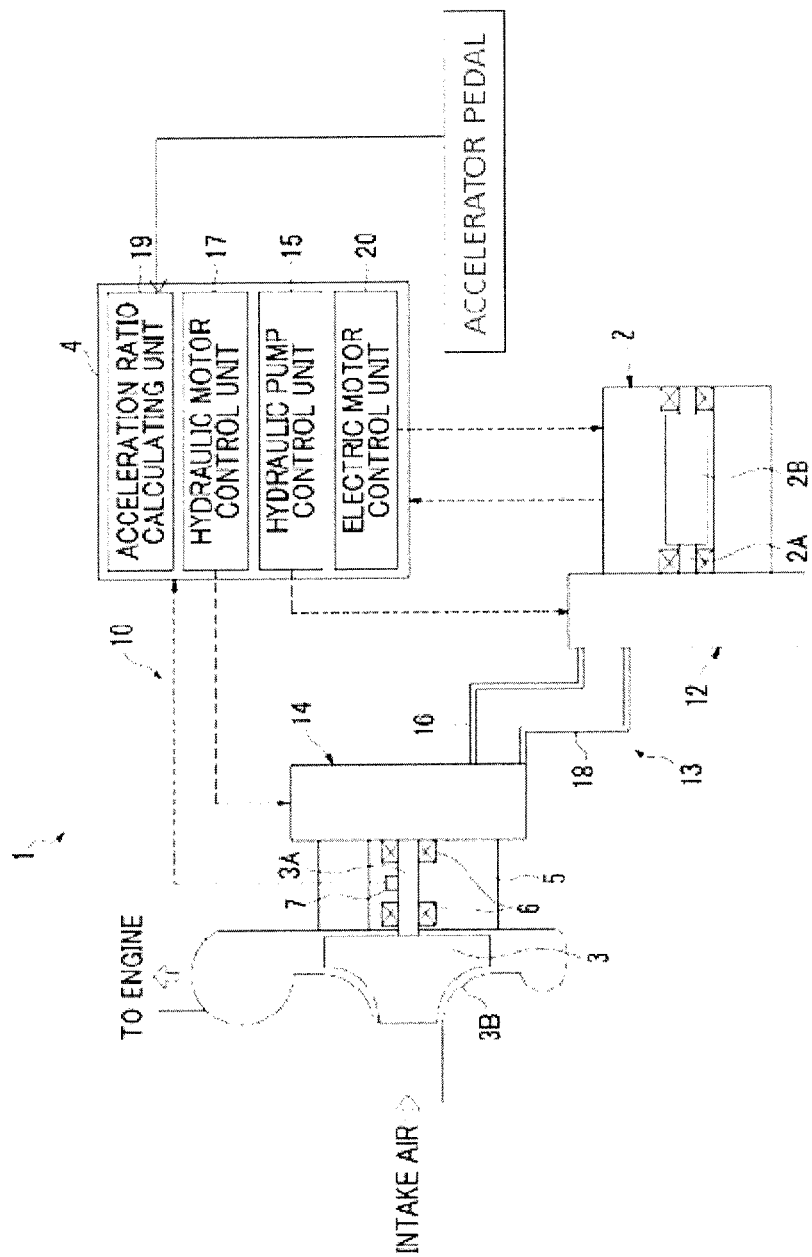
FIG. 1 is a schematic diagram showing an electric supercharging device according to a first embodiment of the invention.

FIG. 1 is a schematic diagram showing an electric supercharging device according to a first embodiment of the invention. First, the entire structure of the electric supercharging device of the invention will be described with reference to FIG. 1.

As shown in FIG. 1, an electric supercharging device 1 of the invention includes an electric motor 2, a compressor 3 that supercharges intake air for a vehicle engine (not shown), a hydraulic accelerator 10 that accelerates the rotation of the electric motor 2 and transmits the rotation to the compressor 3, and rotation speed adjustment controller 4 that controls the rotation speed of the electric motor 2 and an acceleration ratio of the hydraulic accelerator 10 and adjusts the rotation speed of the compressor 3.

The hydraulic accelerator 10 includes a variable displacement hydraulic pump 12 that is connected to an output shaft 2A of the electric motor 2 and is driven by the electric motor 2, a variable displacement hydraulic motor 14 that is connected to a rotating shaft 3A of the compressor 3 and is driven by hydraulic oil supplied from the hydraulic pump 12, and a hydraulic circuit 13 that is formed by the connection between the hydraulic pump 12 and the hydraulic motor 14.

An input shaft of the hydraulic pump 12 is connected to the output shaft 2A, which is directly connected to a motor rotor 2B of the electric motor 2, by a coupling. Accordingly, it is possible to drive the hydraulic pump 12 by the operation of the electric motor 2. The electric motor 2 has a rotation speed-detection function of detecting the rotation speed of the electric motor 2. The rotation speed of the electric motor 2 is output to the rotation speed adjustment controller 4.

An output shaft of the hydraulic motor 14 is connected to the rotating shaft 3A of the compressor 3 by a coupling. The rotating shaft 3A of the compressor 3 passes through a compressor housing 3B of the compressor 3, and is rotatably supported by bearings 6 that are provided in a bearing housing 5. A rotation speed detector 7, which detects the rotation speed of the compressor 3, is provided in the bearing housing 5. A detection value of the rotation speed detector 7 is output to the rotation speed adjustment controller 4.

A discharge port is formed at an upper portion of the compressor housing 3B of the compressor 3. An air supply pipe, which supplies air to the engine, is connected to the discharge port.

The hydraulic circuit 13 of the hydraulic accelerator 10 includes a high-pressure oil flow passage 16 and a low-pressure oil flow passage 18 that are formed between the hydraulic pump 12 and the hydraulic motor 14.

The high-pressure oil flow passage 16 connects the discharge side of the hydraulic pump 12 to the suction side of the hydraulic motor 14, and the low-pressure oil flow passage 18 connects the discharge side of the hydraulic motor 14 to the suction side of the hydraulic pump 12. Accordingly, when the hydraulic pump 12 is driven with the rotation of the electric motor 2, differential pressure is generated between the high-pressure oil flow passage 16 and the low-pressure oil flow passage 18, the hydraulic motor 14 is driven by this differential pressure, and the compressor 3 is rotated.

The rotation speed adjustment controller 4 includes: an acceleration ratio calculating unit 19 that calculates the acceleration ratio of the hydraulic accelerator 10; a hydraulic pump control unit 15 that controls the hydraulic pump 12, the hydraulic motor 14, and the electric motor 2 on the basis of a result calculated by the acceleration ratio calculating unit 19; a hydraulic motor control unit 17; and an electric motor control unit 20.

The hydraulic pump control unit 15 controls a displacement volume as the amount of oil discharged by the rotation of the input shaft of the hydraulic pump 12, that is, the amount of oil discharged per rotation of the input shaft.

The hydraulic motor control unit 17 controls a displacement volume per rotation of the output shaft of the hydraulic motor 14.

The electric motor control unit 20 includes an inverter that is formed of a switching element such as an FET and is built therein, and controls the rotation speed of the electric motor 2 by converting electric power, which is supplied from a battery or the like, into alternating current and arbitrarily changing a voltage and a frequency.

The acceleration ratio calculating unit 19 calculates the acceleration ratio of the hydraulic accelerator 10 (a ratio of the displacement volume of the hydraulic pump 12 and a displacement volume of the hydraulic motor 14) on the basis of a prescribed rotation speed of the compressor 3 that is determined on the basis of a degree of stepping-on detected when a driver steps on an accelerator pedal, a condition of intake air pressure required for the change of the rotation speed of the engine or the like and the rotation speed of the electric motor 2 that is detected by the electric motor 2.

Regarding the calculation of the acceleration ratio performed by the acceleration ratio calculating unit 19, the product V1N1 of a displacement volume V1 of the hydraulic pump 12 and a rotation speed N1 of the hydraulic pump 12 becomes the amount of discharged oil, the product V2N2 of a displacement volume V2 of the hydraulic motor 14 and a rotation speed N2 of the hydraulic motor 14 becomes the amount of inflow oil, and an acceleration ratio and a deceleration ratio (N1 and N2) can be calculated by the adjustment of the displacement volume ratios (V1 and V2) according to a relationship of "V1N1=V2N2".

Although the details of the control of the displacement volumes will be described below in the structures of the hydraulic pump 12 and the hydraulic motor 14, it is possible to adjust the displacement volume in the hydraulic pump 12 by controlling the number of hydraulic chambers 33, which function as pumps, through the control of the opening/closing timings of high-pressure valves 36 and low-pressure valves 38 or controlling ranges in which the hydraulic chambers 33 function as pumps (the ranges of the strokes of pistons 32). Further, it is also possible to adjust the displacement volume in the hydraulic motor 14 by controlling the number of hydraulic chambers 43, which function as motors, through the control of the opening/closing timings of high-pressure valves 46 and low-pressure valves 48 or controlling ranges in which the hydraulic chambers 43 function as motors (the ranges of the strokes of pistons 42).

The acceleration ratio calculating unit 19 determines the displacement volume V1 of the hydraulic pump 12, the rotation speed N1 of the hydraulic pump 12, the displacement volume V2 of the hydraulic motor 14, the rotation speed N2 of the hydraulic motor 14, the opening/closing timings of the high-pressure valves 36 and the low-pressure valves 38, the opening/closing timings of the high-pressure valves 46 and the low-pressure valves 48, and the like so that the calculated acceleration ratio is obtained.

Then, the acceleration ratio calculating unit 19 outputs the displacement volume V1 of the hydraulic pump 12, the rotation speed N1 of the hydraulic pump 12, the opening/closing timings of the high-pressure valves 36 and the low-pressure valves 38, and the like to the hydraulic pump control unit 15. Further, the acceleration ratio calculating unit 19 outputs the displacement volume V2 of the hydraulic motor 14, the rotation speed N2 of the hydraulic motor 14, the opening/closing timings of the high-pressure valves 46 and the low-pressure valves 48, and the like to the hydraulic motor control unit 17.

The hydraulic motor control unit 17 and the hydraulic pump control unit 15 control the hydraulic motor 14 and the hydraulic pump 12, respectively, on the basis of these results.

The acceleration ratio calculating unit 19 compares the prescribed rotation speed of the compressor 3, which has been set, with a measured value of the rotation speed detector 7. When the measured value is different from the prescribed rotation speed, the acceleration ratio calculating unit 19 calculates an acceleration ratio again and determines the displacement volume V1 of the hydraulic pump 12 and the like.

According to the electric supercharging device 1 having the above-mentioned structure, it is possible to rotate the compressor 3 at a prescribed rotation speed, for example, at a rotation speed in the range of 100,000 rpm to 200,000 rpm through the increase of the rotation speed of the electric motor 2 by using the hydraulic accelerator 10.

For example, when a driver steps on an accelerator pedal to accelerate a vehicle, it is necessary to rapidly increase the rotation speed of the compressor 3. In this case, if the rotation speed of the electric motor 2 is rapidly increased to cope with the increase of the rotation speed of the compressor 3 by only the electric motor 2, there is a concern that the electric motor 2 may step out. Accordingly, the rotation speed adjustment controller 4 of the electric supercharging device 1 according to the invention copes with the increase of the rotation speed of the compressor 3 by setting the acceleration ratio of the hydraulic accelerator 10 to a high acceleration ratio without rapidly changing the rotation speed of the electric motor 2 at the time of the acceleration of a vehicle.

After the compressor 3 reaches a prescribed rotation speed, the rotation speed adjustment controller 4 gradually increases the rotation speed of the electric motor 2 and reduces the acceleration ratio of the hydraulic accelerator 10 to perform control so that the compressor 3 can be rotated at the prescribed rotation speed. In this case, the acceleration ratio calculating unit 19 determines the rotation speed of the electric motor 2 and calculates the acceleration ratio of the hydraulic accelerator 10. After that, the acceleration ratio calculating unit 19 outputs the determined rotation speed of the electric motor 2 to the electric motor control unit 20, and outputs the displacement volumes V1 and V2, and the like to the hydraulic motor control unit 17 and the hydraulic pump control unit 15, respectively.

The electric motor control unit 20 controls the electric motor 2 so that the electric motor 2 reaches the rotation speed of the electric motor 2 output from the acceleration ratio calculating unit 19. Further, the hydraulic motor control unit 17 and the hydraulic pump control unit 15 controls the hydraulic motor 14 and the hydraulic pump 12 so that the acceleration ratio output from the acceleration ratio calculating unit 19 is obtained.

Since the electric supercharging device 1 according to the invention includes the hydraulic accelerator 10 that accelerates the rotation of the electric motor 2 and transmits the rotation to the compressor 3 as described above, it is possible to rotate the compressor 3 at a speed higher than the rotation speed of the electric motor 2. Accordingly, it is possible to rotate the compressor 3 at a prescribed rotation speed without applying a high load to the electric motor 2. Therefore, it is possible to prevent the electric motor 2 from reaching a high temperature.

In addition, since the hydraulic accelerator 10 includes the hydraulic motor 14, the hydraulic pump 12, and the hydraulic circuit 13, the hydraulic pump 12 can be disposed at a position away from the hydraulic motor 14. For this reason, the degree of freedom in layout is improved. Accordingly, the electric motor 2 can be disposed at a position away from the compressor 3. Therefore, it is possible to obtain a layout in which a cooler for cooling the electric motor 2 can be installed.

Since the rotation speed of the electric motor 2 and the acceleration ratio of the hydraulic accelerator 10 can be adjusted by the rotation speed adjustment controller 4, it is possible to appropriately change the combination of the rotation speed of the electric motor 2 and the acceleration ratio of the hydraulic accelerator 10. Accordingly, it is possible to prevent a high load from being applied to either the electric motor 2 or the hydraulic accelerator 10.

If the rotation speed of the electric motor 2 is rapidly increased to rapidly increase the rotation speed of the compressor 3, there is a concern that the electric motor 2 may step out or the control of the rotation speed may become unstable. However, according to the invention, it is possible to cope with the increase of the rotation speed of the compressor 3 by increasing the acceleration ratio of the hydraulic accelerator 10 without rapidly changing the rotation speed of the electric motor 2. Accordingly, it is possible to prevent the electric motor 2 from stepping out and to perform stable control.

Further, since the electric supercharging device 1 includes the hydraulic accelerator 10, it is possible to operate the electric motor 2 at a rotation speed where the torque output of the electric motor 2 is highest. Accordingly, an expensive electric motor 2 that can be rotated at a high speed and can output high torque does not need to be used, and an inexpensive electric motor 2 may be used.

Next, the structures of the hydraulic pump 12 and the hydraulic motor 14 will be described with reference to FIGS. 2 and 3.

Regarding the Hydraulic Pump 12

Figure 2:
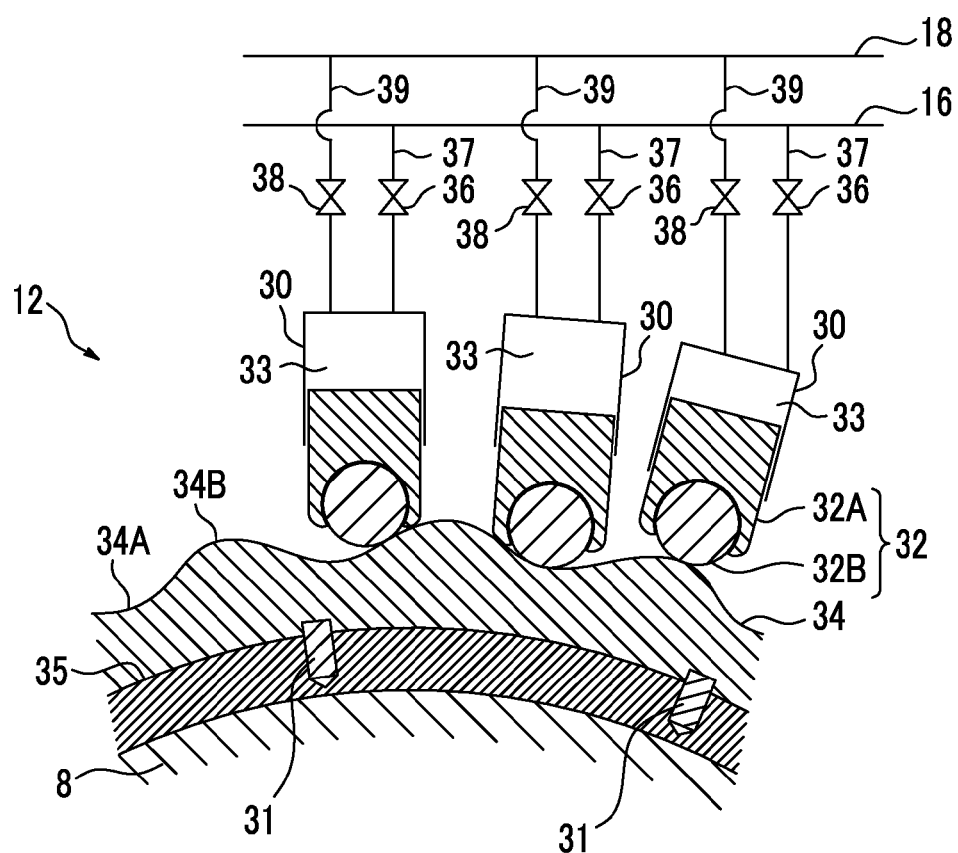
FIG. 2 is a view showing an example of a structure of a hydraulic pump of the electric supercharging device.

As shown in FIG. 2, the hydraulic pump 12 includes a plurality of hydraulic chambers 33 that are formed by cylinders 30 and the pistons 32, a cam 34 that has a cam curved surface engaged with the pistons 32, and the high-pressure valves 36 and the low-pressure valves 38 that are provided for the respective hydraulic chambers 33.

The cylinder 30 is a cylinder that is provided in a cylinder block to be described below. The hydraulic chamber 33, which is surrounded by the cylinder 30 and the piston 32, is formed in the cylinder 30.

From the viewpoint that the pistons 32 are smoothly operated along the cam curve of the cam 34, it is preferable that the piston 32 include a piston body 32A sliding in the cylinder 30 and a piston roller or a piston shoe mounted on the piston body 32A and engaged with the cam curved surface of the cam 34. Here, the "piston roller" is a member that rotates while coming into contact with the cam curved surface of the cam 34, and the "piston shoe" is a member that slides while coming into contact with the cam curved surface of the cam 34.

Meanwhile, FIG. 2 shows an example in which the piston 32 includes the piston body 32A and a piston roller 32B.

The cam 34 is mounted on the outer peripheral surface of the input shaft 8 of the hydraulic pump 12 with a cam mount 35 interposed therebetween. From the viewpoint that the cam 34 increases the torque of the hydraulic pump 12 by moving each piston 32 of the hydraulic pump 12 up and down several times while the input shaft 8 of the hydraulic pump 12 is rotated, it is preferable that the cam 34 be a ring cam having a wavy cam curved surface on which a plurality of concave portions 34A and convex portions 34B are alternately formed side by side around the input shaft 8 of the hydraulic pump 12.

The fixing of the cam 34 to the cam mount 35 is performed using arbitrary fixing members 31, such as bolts, keys, or pins.

The high-pressure valve 36 is provided on a high-pressure communication passage 37 between each hydraulic chamber 33 and the high-pressure oil flow passage 16. Meanwhile, the low-pressure valve 38 is provided on a low-pressure communication passage 39 between each hydraulic chamber 33 and the low-pressure oil flow passage 18. It is possible to switch communication states between each hydraulic chamber 33 and the high-pressure oil flow passage 16 and the low-pressure oil flow passage 18 by opening and closing the high-pressure valve 36 and the low-pressure valve 38. The opening and closing of the high-pressure valve 36 and the low-pressure valve 38 are performed in synchronization with the timing of the cycle of the upward and downward movement of the piston 32.

When the cam 34 is rotated together with the input shaft 8 in the hydraulic pump 12, the piston body 32A of each piston 32 is cyclically moved up and down and a pump step in which the piston 32 moves to a top dead center from a bottom dead center and a suction step in which the piston 32 moves to a bottom dead center from a top dead center are repeated. The high-pressure valve 36 is opened and the low-pressure valve 38 is closed in the pump step, so that high-pressure oil present in the hydraulic chamber 33 is sent to the high-pressure oil flow passage 16 through the high-pressure communication passage 37. Meanwhile, the high-pressure valve 36 is closed and the low-pressure valve 38 is opened in the suction step, so that low-pressure oil is supplied to the hydraulic chamber 33 from the low-pressure oil flow passage 18 through the low-pressure communication passage 39.

Accordingly, when the hydraulic pump 12 is driven with the rotation of the input shaft 8 of the hydraulic pump 12, differential pressure is generated between the high-pressure oil flow passage 16 and the low-pressure oil flow passage 18.

Further, the adjustment of the displacement volume of the hydraulic pump 12 is performed by, for example, controlling some cylinders 30 of the plurality of cylinders 30 so that the some cylinders 30 enter an idle state. The control to enter the idle state is performed by, for example, opening the low-pressure valve 38 at the time of the pump step. Furthermore, it is also possible to adjust the displacement volume of the entire hydraulic pump 12 by controlling the opening/closing timings of the high-pressure valve 36 and the low-pressure valve 38 for each cylinder 30 and adjusting the displacement volume of each cylinder 30.

Regarding the Hydraulic Motor 14

Figure 3:
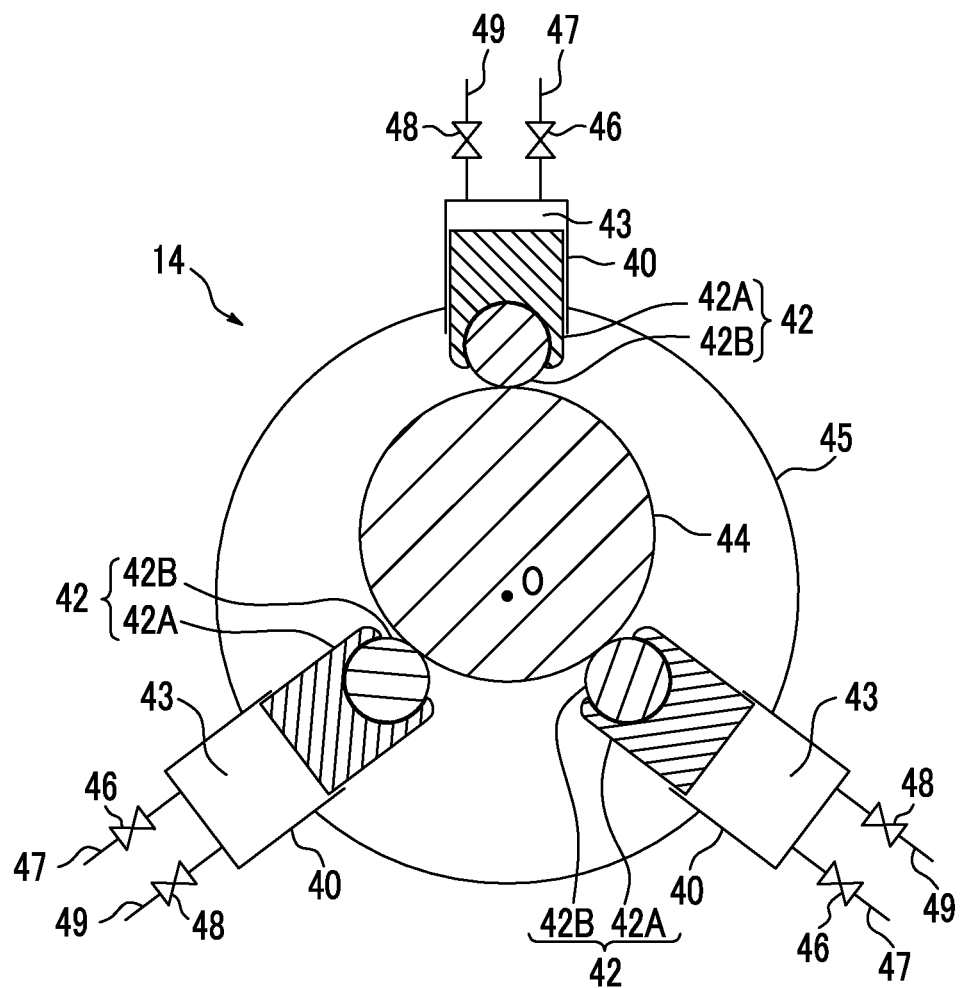
FIG. 3 is a view showing an example of a structure of a hydraulic motor of the electric supercharging device.

As shown in FIG. 3, the hydraulic motor 14 includes a plurality of hydraulic chambers 43 that are formed by cylinders 40 and pistons 42, a cam 44 that has a cam curved surface engaged with the pistons 42, and the high-pressure valves 46 and the low-pressure valves 48 that are provided for the respective hydraulic chambers 43.

The cylinder 40 is a cylinder that is provided in a cylinder block to be described below. The hydraulic chamber 43, which is surrounded by the cylinder 40 and the piston 42, is formed in the cylinder 40.

From the viewpoint that the upward and downward movement of the pistons 42 is smoothly converted into the rotational movement of the cam 44, it is preferable that the piston 42 include a piston body 42A sliding in the cylinder 40 and a piston roller or a piston shoe mounted on the piston body 42A and engaged with the cam curved surface of the cam 44. Here, the "piston roller" is a member that rotates while coming into contact with the cam curved surface of the cam 44, and the "piston shoe" is a member that slides while coming into contact with the cam curved surface of the cam 44.

Meanwhile, FIG. 3 shows an example in which the piston 42 includes the piston body 42A and a piston roller 42B.

The cam 44 is an eccentric cam that is provided so as to be eccentric from an axis O of an output shaft 45 of the hydraulic motor 14 connected to the compressor 3. While the piston 42 makes one upward and downward movement, the cam 44 and the output shaft 45 of the hydraulic motor 14 on which the cam 44 is mounted make one rotation.

The high-pressure valve 46 is provided on a high-pressure communication passage 47 between each hydraulic chamber 43 and the high-pressure oil flow passage 16. Meanwhile, the low-pressure valve 48 is provided on a low-pressure communication passage 49 between each hydraulic chamber 43 and the low-pressure oil flow passage 18. It is possible to switch communication states between each hydraulic chamber 43 and the high-pressure oil flow passage 16 and the low-pressure oil flow passage 18 by opening and closing the high-pressure valve 46 and the low-pressure valve 48. The opening and closing of the high-pressure valve 46 and the low-pressure valve 48 are performed in synchronization with the timing of the cycle of the upward and downward movement of the piston 42.

In the hydraulic motor 14, the pistons 42 are moved up and down by differential pressure between the high-pressure oil flow passage 16 and the low-pressure oil flow passage 18, and a motor step in which the piston 42 moves to a bottom dead center from a top dead center and a discharge step in which the piston 42 moves to a top dead center from a bottom dead center are repeated. The high-pressure valve 46 is opened and the low-pressure valve 48 is closed in the motor step, so that high-pressure oil is supplied to the hydraulic chamber 43 from the high-pressure oil flow passage 16 through the high-pressure communication passage 47. Meanwhile, the high-pressure valve 46 is closed and the low-pressure valve 48 is opened in the discharge step, so that hydraulic oil present in the hydraulic chamber 43 is discharged to the low-pressure oil flow passage 18 through the low-pressure communication passage 49.

Accordingly, when high-pressure oil, which has flowed into the hydraulic chamber 43 in the motor step, pushes down the piston 42 to a bottom dead center, the output shaft 45 of the hydraulic motor 14 is rotated together with the cam 44.

Further, as in the case of the hydraulic pump 12, the adjustment of the displacement volume of the hydraulic motor 14 is performed by, for example, controlling some cylinders 40 of the plurality of cylinders 40 so that the some cylinders 40 enter an idle state. The control to enter the idle state is performed by, for example, opening the low-pressure valve 48 at the time of the motor step. Furthermore, it is also possible to adjust the displacement volume of the entire hydraulic motor 14 by controlling the opening/closing timings of the high-pressure valve 46 and the low-pressure valve 48 for each cylinder 40 and adjusting the displacement volume of each cylinder 40.

Since it is possible to adjust a flow rate without throttling by controlling the operating states of the plurality of hydraulic chambers 33 and 43 (the number of the hydraulic chambers 33 and 43 or the ranges of the operating strokes of the pistons 32 and 42 provided in the hydraulic chambers 33 and 43) of the hydraulic pump 12 and the hydraulic motor 14 with a small amount of hydraulic oil by the high-pressure valves 36 and 46 and the low-pressure valves 38 and 48 as described above, it is possible to adjust an acceleration ratio and a deceleration ratio over a wide range with low loss and high responsiveness. Accordingly, it is possible to efficiently transmit power from the electric motor 2 to the compressor 3. Therefore, it is possible to obtain the electric supercharging device 1 that has not only high responsiveness and high efficiency but also excellent controllability by using the hydraulic pump 12 and the hydraulic motor 14 according to the invention.

Further, since the hydraulic motor 14 is driven by hydraulic oil that circulates, heat is not confined in the hydraulic accelerator 10. Accordingly, a cooler does not need to be provided, unlike in the electric motor 2. Furthermore, since the variable displacement hydraulic pump 12 and the variable displacement hydraulic motor 14 are used, it is possible to control the rotation speed of the hydraulic motor 14 by adjusting the displacement volume ratios of both the variable displacement hydraulic pump 12 and the variable displacement hydraulic motor 14. Accordingly, a mechanical transmission does not need to be separately provided.

Second Embodiment

Next, a second embodiment of the invention will be described. In the following description, portions corresponding to the above-mentioned first embodiment are denoted by the same reference numerals and the description thereof will be omitted and a difference between the first and second embodiment will be mainly described. An electric supercharging device of the second embodiment is provided with a planetary roller type traction drive instead of the bearing housing 5 of the first embodiment.

Figure 4:
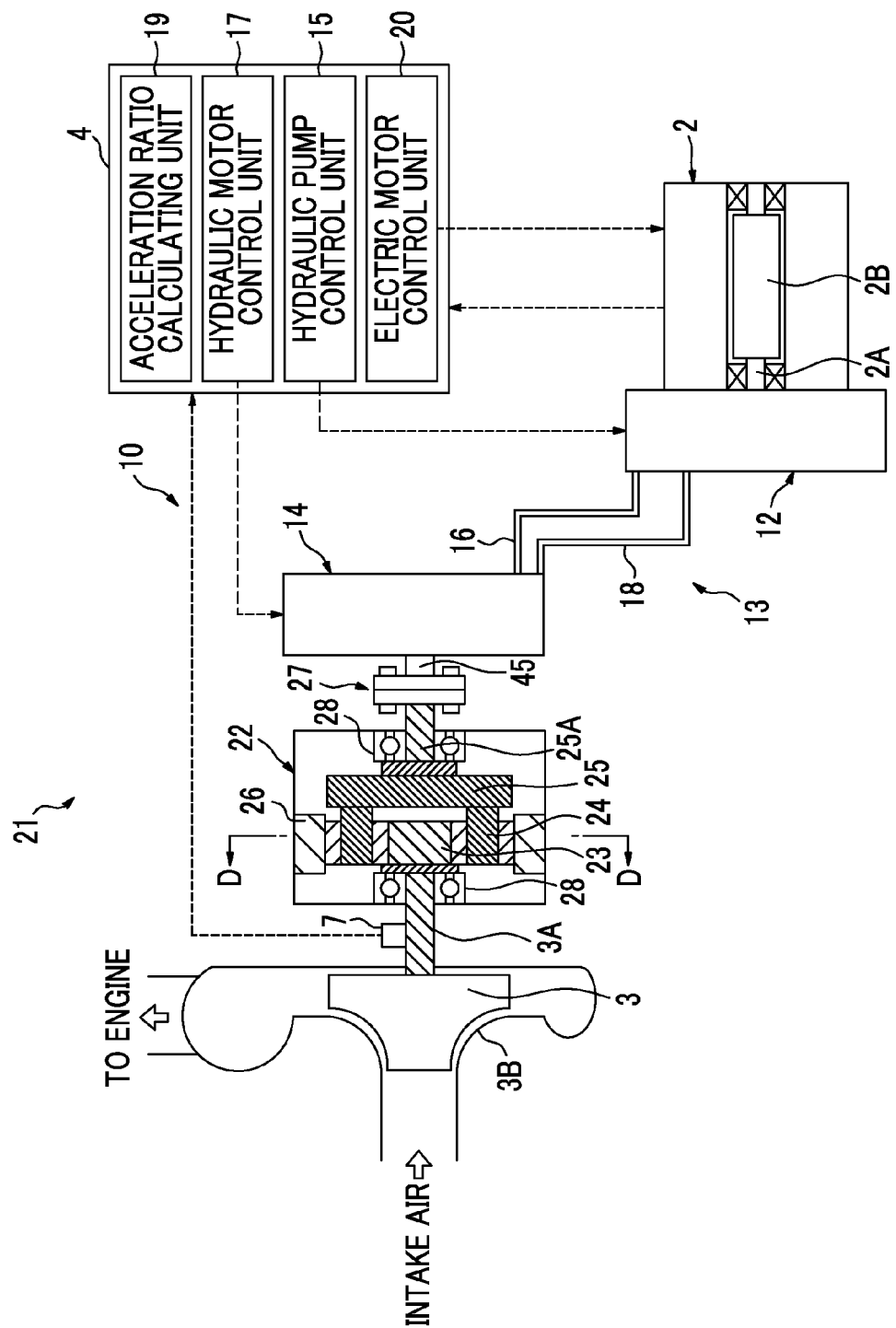
FIG. 4 is a schematic diagram showing an electric supercharging device according to a second embodiment of the invention.
Figure 5:
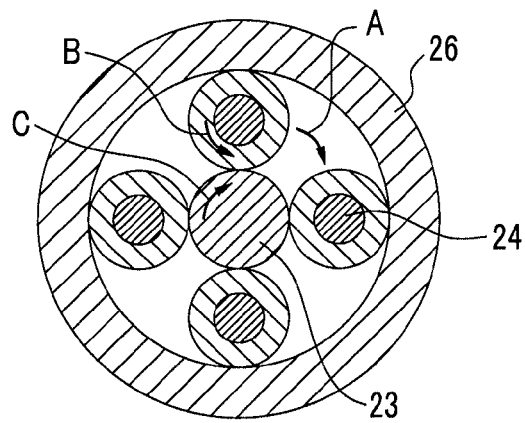
FIG. 5 is a cross-sectional view taken along line D-D of FIG. 4.
Figure 6:
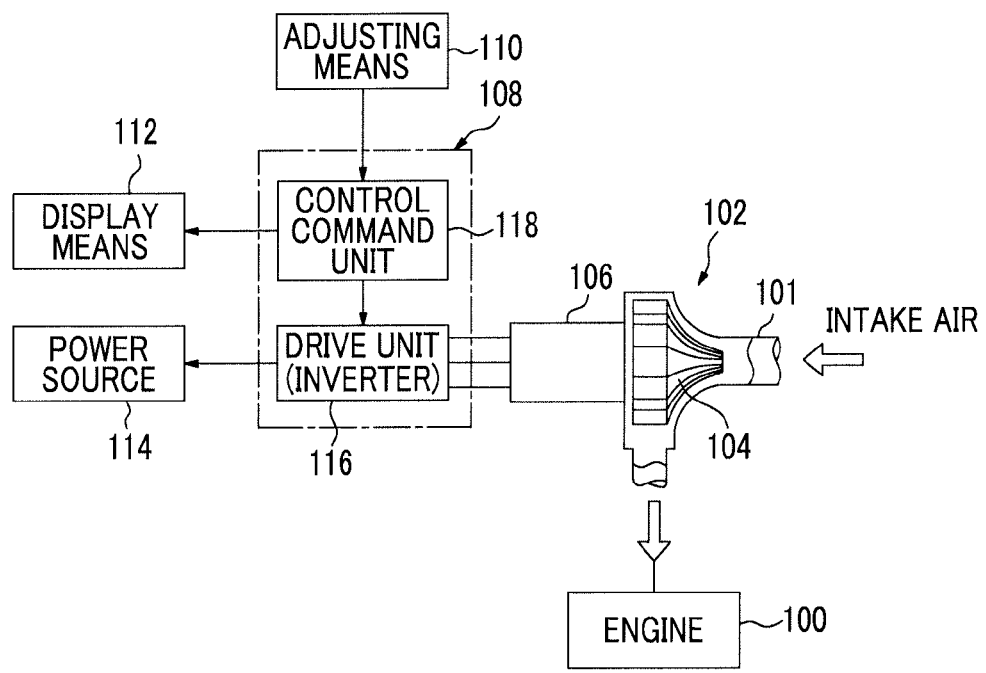
FIG. 6 is a view showing an electric supercharging device in the related art.

FIG. 4 is a schematic diagram showing the electric supercharging device according to the second embodiment of the invention. FIG. 5 is a cross-sectional view taken along line D-D of FIG. 4.

As shown in FIGS. 4 and 5, an electric supercharging device 21 includes a planetary roller type traction drive 22 between a compressor 3 and a hydraulic motor 14.

The planetary roller type traction drive 22 includes a sun roller 23 that is connected to a rotating shaft 3A of the compressor 3, a plurality of planetary rollers 24 that are disposed so as to press against the outer peripheral surface of the sun roller 23, a carrier 25 that supports the plurality of planetary rollers 24 so as to allow the planetary rollers to freely rotate and revolve, and a ring roller 26 that is disposed outside the plurality of planetary rollers 24 and is disposed so as to press against the plurality of planetary rollers 24.

An output shaft 45 of the hydraulic motor 14 is connected to an input shaft 25A of the carrier 25 by a coupling 27. Meanwhile, a case in which the output shaft 45 of the hydraulic motor 14 is connected to the carrier 25 has been described in this embodiment, but the output shaft 45 may be connected to the ring roller 26.

Thrust bearings 28, which prevent the planetary roller type traction drive 22 from moving in an axial direction, are provided on the rotating shaft 3A of the compressor 3 and the input shaft 25A of the carrier 25.

When the hydraulic motor 14 is rotated, the carrier 25 revolves, for example, in a direction of an arrow A of FIG. 5. In this case, since the ring roller 26 is fixed and traction is applied to contact portions between the planetary rollers 24 and the carrier 25, the carrier 25 revolves and the planetary rollers 24 rotate in a direction of an arrow B.

Further, since traction is also applied to contact portions between the planetary rollers 24 and the sun roller 23, the sun roller 23 is rotated in a direction of an arrow C.

Furthermore, when the rotating shaft 3A of the compressor 3 connected to the sun roller 23 is rotated together with the sun roller 23, the compressor 3 is rotated. At this time, the planetary roller type traction drive 22 functions as an accelerator.

Since the electric supercharging device 21 according to the invention includes the planetary roller type traction drive 22 as described above, it is possible to further increase the rotation speed, which has been increased by the hydraulic pump 12 and the hydraulic motor 14, in addition to the effect of the above-mentioned first embodiment. Accordingly, since it is possible to reduce the rotation speed of the hydraulic motor 14, it is possible to prevent the generation of an excessive centrifugal force that is generated in the hydraulic motor 14 at the time of the high-speed rotation of the hydraulic motor 14.

Further, since the rotating shaft 3A of the compressor 3 is connected to the sun roller 23 and the sun roller 23 is interposed between the planetary rollers 24 in several directions, a radial bearing is not needed.

Furthermore, it is possible to reduce vibration and noise by using the planetary roller type traction drive 22.

Meanwhile, a case in which the planetary roller type traction drive 22 is used has been described in this embodiment, but a planetary type gear may be used.

INDUSTRIAL APPLICABILITY

The invention can be used as an electric supercharging device that can accelerate the rotation of an electric motor and transmit the rotation to a compressor.

The invention claimed is:

1. An electric supercharging device that supercharges intake air into an internal combustion engine of a vehicle by rotating a compressor, which is not connected to an exhaust turbine, through a drive of an electric motor, the electric supercharging device comprising:
  an accelerator that accelerates a rotation of the electric motor and transmitting the rotation to the compressor;
    wherein the accelerator includes:
      a variable displacement hydraulic pump that is connected to the electric motor, is driven by the electric motor, and includes a displacement volume;
      a variable displacement hydraulic motor that is connected to the compressor, is driven by hydraulic oil supplied from the variable displacement hydraulic pump, and includes a displacement volume; and
      a rotation speed controller that determines a ratio of the displacement volume of the variable displacement hydraulic pump to the displacement volume of the variable displacement hydraulic motor higher than 1 by controlling the hydraulic pump and the hydraulic motor and adjusts a rotation speed of the variable displacement hydraulic motor higher than a rotation speed of the electric motor;
    wherein during an acceleration of the vehicle, the rotation speed controller is to control the variable displacement hydraulic pump and the variable displacement hydraulic motor to suppress an increase ratio of the rotation speed of the electric motor within a prescribed range and increase an acceleration ratio of the accelerator so as to increase a rotation speed of the compressor.

2. The electric supercharging device according to claim 1, wherein
the accelerator further includes a planetary roller type traction drive or a planetary type gear including:
a sun roller or a sun gear that is connected to a rotating shaft of the compressor;
a plurality of planetary rollers or planetary gears that are disposed along the outer periphery of the sun roller or the sun gear and come into contact with the sun roller or the sun gear;
a carrier that supports the plurality of the planetary rollers or the planetary gears so as to allow the plurality of the planetary rollers or the planetary gears to freely rotate and revolve;
an annular ring roller that is disposed outside the plurality of the planetary rollers or the planetary gears and comes into contact with the plurality of the planetary rollers or the planetary gears; and
an output shaft of the variable displacement hydraulic motor is connected to any one of the carrier and the ring roller.

3. The electric supercharging device according to claim 2, wherein the variable displacement hydraulic pump includes:
a plurality of hydraulic chambers that are surrounded by a plurality of cylinders and pistons sliding in the plurality of the cylinders;
a cam that has a cam curved surface engaged with the pistons;
high-pressure valves that open and close high-pressure oil flow passages of a respective hydraulic circuits connected to the respective hydraulic chambers; and
low-pressure valves that open and close low-pressure oil flow passages of the respective hydraulic circuits connected to the respective hydraulic chambers;
wherein the plurality of the cylinders are continuously disposed in an annular shape around a rotating shaft of the variable displacement hydraulic pump; and
wherein the cam is formed of an annular ring cam having a wavy cam curved surface on which a plurality of concave portions and convex portions are alternately formed side by side.

4. The electric supercharging device according to claim 3, wherein the variable displacement hydraulic motor includes:
a plurality of hydraulic chambers that are surrounded by a plurality of cylinders and pistons sliding in the plurality of the cylinders;
a cam that has a cam curved surface engaged with the pistons;
high-pressure valves that open and close high-pressure oil flow passages of the respective hydraulic circuits connected to the respective hydraulic chambers; and
low-pressure valves that open and close low-pressure oil flow passages of the respective hydraulic circuits connected to the respective hydraulic chambers,
wherein the plurality of the cylinders are continuously disposed in an annular shape around a rotating shaft of the variable displacement hydraulic motor; and
wherein the cam is formed of an eccentric cam that is provided to be eccentric from an axis of a rotating shaft of the variable displacement hydraulic motor.

5. The electric supercharging device according to claim 2, wherein the variable displacement hydraulic motor includes:
a plurality of hydraulic chambers that are surrounded by a plurality of cylinders and pistons sliding in the plurality of the cylinders;
a cam that has a cam curved surface engaged with the pistons;
high-pressure valves that open and close high-pressure oil flow passages of the respective hydraulic circuits connected to the respective hydraulic chambers; and
low-pressure valves that open and close low-pressure oil flow passages of the respective hydraulic circuits connected to the respective hydraulic chambers;
wherein the plurality of the cylinders are continuously disposed in an annular shape around a rotating shaft of the variable displacement hydraulic motor; and
wherein the cam is formed of an eccentric cam that is provided to be eccentric from an axis of a rotating shaft of the variable displacement hydraulic motor.

6. The electric supercharging device according to claim 1, wherein the variable displacement hydraulic pump includes:
a plurality of hydraulic chambers that are surrounded by a plurality of cylinders and pistons sliding in the plurality of the cylinders;
a cam that has a cam curved surface engaged with the pistons;
high-pressure valves that open and close high-pressure oil flow passages of a respective hydraulic circuits connected to the respective hydraulic chambers; and
low-pressure valves that open and close low-pressure oil flow passages of the respective hydraulic circuits connected to the respective hydraulic chambers;
wherein the plurality of the cylinders are continuously disposed in an annular shape around a rotating shaft of the variable displacement hydraulic pump; and
wherein the cam is formed of an annular ring cam having a wavy cam curved surface on which a plurality of concave portions and convex portions are alternately formed side by side.

7. The electric supercharging device according to claim 1, wherein, after the rotation speed of the compressor reaches at a prescribed rotation speed during the acceleration of the vehicle, the rotation speed controller is to control the variable displacement hydraulic pump and the variable displacement hydraulic motor to increase the rotation speed of the electric motor and reduce the acceleration ratio of the accelerator so as to maintain the rotation speed of the compressor.

* * * * *